United States Patent
Morita et al.

(10) Patent No.: US 9,976,036 B2
(45) Date of Patent: May 22, 2018

(54) ORGANIC SOLVENT DISPERSION OF ZIRCONIUM OXIDE PARTICLES AND METHOD FOR PRODUCING SAME

(71) Applicant: SAKAI CHEMICAL INDUSTRY CO., LTD., Osaka (JP)

(72) Inventors: Takanori Morita, Osaka (JP); Atsushi Miyata, Osaka (JP); Kasumi Onishi, Osaka (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 0 days. days.

(21) Appl. No.: 15/508,139

(22) PCT Filed: Aug. 28, 2015

(86) PCT No.: PCT/JP2015/074349
§ 371 (c)(1),
(2) Date: Mar. 2, 2017

(87) PCT Pub. No.: WO2016/035689
PCT Pub. Date: Mar. 10, 2016

(65) Prior Publication Data
US 2017/0306161 A1    Oct. 26, 2017

(30) Foreign Application Priority Data
Sep. 5, 2014  (JP) ................. 2014-181186

(51) Int. Cl.
| C09C 3/12 | (2006.01) |
| C09C 1/00 | (2006.01) |
| C08K 3/22 | (2006.01) |
| C08K 9/06 | (2006.01) |

(52) U.S. Cl.
CPC .............. *C09C 3/12* (2013.01); *C08K 3/22* (2013.01); *C08K 9/06* (2013.01); *C09C 1/00* (2013.01); *C01P 2004/64* (2013.01); *C01P 2006/60* (2013.01); *C08K 2003/2244* (2013.01)

(58) Field of Classification Search
CPC .... C09C 1/00; C09C 3/12; C08K 3/22; C08K 9/06; C08K 2003/2244; C01P 2004/64; C01P 2006/60
See application file for complete search history.

(56) References Cited

U.S. PATENT DOCUMENTS

2012/0217456 A1    8/2012  Nagakawa et al.

FOREIGN PATENT DOCUMENTS

| JP | 2005-307158 | | 11/2005 |
| JP | 2007-238422 | | 9/2007 |
| JP | 2008-44835 | | 2/2008 |
| JP | 2008-179514 | | 8/2008 |
| JP | 2009-215087 | | 9/2009 |
| JP | 2010-189506 A | * | 9/2010 |
| JP | 2013-82609 | | 5/2013 |
| JP | 2013-216858 | | 10/2013 |
| JP | 2015-117157 A | * | 6/2015 |
| WO | 2008/010533 | | 1/2008 |
| WO | 2011/052762 | | 5/2011 |

OTHER PUBLICATIONS

International Search Report dated Oct. 6, 2015 in International Application No. PCT/JP2015/074349.

* cited by examiner

*Primary Examiner* — Anthony J Green
(74) *Attorney, Agent, or Firm* — Wenderoth, Lind & Ponack, L.L.P.

(57) ABSTRACT

The invention provides an organic solvent dispersion of zirconium oxide particles in a content of 20% by weight or more in an organic solvent except methanol and ethanol.

13 Claims, No Drawings

ORGANIC SOLVENT DISPERSION OF ZIRCONIUM OXIDE PARTICLES AND METHOD FOR PRODUCING SAME

TECHNICAL FIELD

The invention relates to a dispersion of zirconium oxide particles in an organic solvent, i.e., an organic dispersion of zirconium oxide particles, and a method for producing the same. The invention relates more particularly to an organic solvent dispersion of zirconium oxide particles which contains zirconium oxide particles in a high content, has a low viscosity, and is also superior in stability and transparency, and a method for producing the same. Since the organic solvent dispersion of zirconium oxide particles according to the invention contains zirconium oxide particles in a high content, has a low viscosity, and is also superior in stability and transparency, it is useful in various applications in the field of optics, especially as a material for an optical composite resin such as an LED sealing resin or an anti-reflection coating.

BACKGROUND OF THE INVENTION

Dispersions of particles of an inorganic oxide such as silica, alumina, zinc oxide, tin oxide, zirconia, and titania are employed in various industrial fields, particularly in the field of optics for modulating refractive index. Among those oxides, zirconia is employed preferably for increasing the refractive index of an optical material because it has a high refractive index.

Such a dispersion of inorganic oxide particles which has been employed conventionally contained water as its dispersion medium, i.e., as an aqueous dispersion, and most of the optical material applications such as optical film production utilizes such an aqueous dispersion usually as being mixed with resin components. However, such an aqueous dispersion is kneaded only with difficulty in particular with a water-insoluble resin component. Accordingly, a dispersion of which dispersion medium is an organic solvent is becoming highly demanded in these days. The inorganic oxide particles including zirconium oxide particles are generally dispersible satisfactorily in aqueous solvents, but are poorly dispersible generally in organic solvents.

Accordingly, it is proposed that an organic solvent is added to an aqueous dispersion of zirconia particles in the presence of a zirconia stabilizer such as acetic acid thereby replacing water as a dispersion medium of the aqueous dispersion with the organic solvent to obtain an organic solvent dispersion of zirconia particles (see Patent Literature 1).

Nevertheless, the organic solvent dispersion of zirconium oxide particles is not sufficiently stable when it contains only a zirconia stabilizer such as acetic acid. Accordingly it is well known that when an organic solvent dispersion of zirconium oxide particles is prepared, the zirconium oxide particles are subjected to surface treatment with a surface treatment agent such as a silane coupling agent thereby making the particles lipophilic, and are then dispersed in an organic solvent.

For example, a method was proposed in which a silane coupling agent is added to an aqueous dispersion of zirconium oxide particles to surface-treat the zirconium oxide particles, followed by solid-liquid separation, and heating and drying to obtain a powder of zirconium oxide, which is then dispersed in an organic solvent thereby obtaining an organic solvent dispersion of zirconium oxide particles (see Patent Literature 2).

Similarly, a method was proposed in which a silane coupling agent is added to a dispersion of zirconium oxide particles in a mixture of solvents of water and methanol, and the solvents are removed without conducting a process of replacing the solvents, and the resultant is dried to obtain a powder of surface-treated zirconium oxide, which is then dispersed, for example, in a ketone solvent thereby obtaining an organic solvent dispersion (see Patent Literature 3).

A method was also proposed in which zirconium oxide particles of which surfaces are coated with a long-chain fatty acid such as neodecanoic acid are prepared, and are then dispersed in an organic solvent, and further coated with a silane coupling agent, subjected to solid-liquid separation thereby obtaining zirconium oxide particles of which surfaces are coated with two different coatings, which are then dispersed in an organic solvent thereby obtaining an organic solvent dispersion (see Patent Literature 4).

However, even when such a powder of surface-treated zirconia particles is obtained and is then dispersed in an organic solvent, the powder of zirconia particles generally undergo substantial agglomeration and is re-dispersed with great difficulty, and the resultant dispersion is poorly stable and its transparency is not necessarily sufficient.

Accordingly, a method was also proposed in which inorganic oxide particles are surface-treated with a hydrolyzate and/or partial condensate of a silane coupling agent in the presence of an acid catalyst in an alcohol solvent having a low ketone solvent content, and thereafter the alcohol solvent is replaced with an organic solvent having a higher ketone solvent content thereby achieving solvent replacement while the surface-treated inorganic oxide particles are dispersed in the organic solvent thereby to obtain an organic solvent dispersion of the surface-treated inorganic oxide particles, in particular, a ketone solvent dispersion of silica particles (see Patent Literature 5).

A further method was also proposed in which an alcoholic solvent dispersion of zirconium oxide particles is preliminarily surface-treated with a silane coupling agent in the presence of an organic acid, and then the alcoholic solvent is replaced with a more lipophilic organic solvent such as a ketone solvent thereby obtaining an organic solvent dispersion of zirconium oxide particles of (see Patent Literature 6).

However, the above-mentioned known methods are not successful in providing an organic solvent dispersion having a sufficient transparency depending on applications. In addition, the organic solvent dispersion obtained suffers poor stability such as gradual increase in viscosity. Such being the case, a higher performance of an optical material is becoming highly demanded in these days, and an organic solvent dispersion of zirconium oxide particles which has a low viscosity and is superior in stability and transparency is highly demanded.

PRIOR ART DOCUMENTS

Patent Literatures

Patent Literature 1: Japanese Unexamined Patent Application Publication No. 2007-238422
Patent Literature 2: Japanese Unexamined Patent Application Publication No. 2008-179514
Patent Literature 3: Japanese Unexamined Patent Application Publication No. 2013-82609

Patent Literature 4: Japanese Unexamined Patent Application Publication No. 2008-44835
Patent Literature 5: Japanese Unexamined Patent Application Publication No. 2005-307158
Patent Literature 6: International Publication WO2011/052762

SUMMARY OF THE INVENTION

Problems to be Solved by the Invention

The invention has been completed to solve the above-mentioned problems involved in organic solvent dispersion of zirconium oxide particles. Therefore, it is an object of the invention to provide an organic solvent dispersion of zirconium oxide particles which contains zirconium oxide particles in a high content, has a low viscosity, and is also superior in stability and transparency, as well as a method for producing the same.

Means to Solve the Problems

The invention provides an organic solvent dispersion of zirconium oxide particles in a content of 20% by weight or more in an organic solvent except methanol and ethanol, wherein the zirconium oxide particles are surface-treated with a surface treating agent comprising a silane coupling agent having the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group, and 12-hydroxystearic acid, and
wherein the zirconium oxide particles in the organic solvent have a D50 in a range of 1 to 20 nm, and
wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while the increase in the viscosity is 10 mPa·s or less seven days after production as compared to that of the dispersion immediately after production.

The invention further provides a method for producing the above-mentioned organic solvent dispersion of zirconium oxide particles.

Thus, the invention provides a method for producing an organic solvent dispersion of zirconium oxide particles in a content of 20% by weight or more in an organic solvent except methanol and ethanol,
wherein the zirconium oxide particles in the organic solvent have a D50 in a range of 1 to 20 nm, and
wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while the increase in the viscosity is 10 mPa·s or less seven days after production as compared to that of the dispersion immediately after production.

the method comprising:
a surface treating process for surface treating an alcohol dispersion of zirconium oxide particles in at least one alcohol solvent selected from methanol and ethanol with a surface treating agent comprising a silane coupling agent and 12-hydroxystearic acid thereby surface treating the zirconium oxide particles; and a solvent replacing process for replacing the alcohol solvent that is a dispersion medium of the alcohol dispersion of zirconium oxide particles with the organic solvent except methanol and ethanol,
wherein the silane coupling agent has the general formula $$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group.

In the invention, the alcohol dispersion of zirconium oxide particles used in the surface treating process among the processes of the method for producing the organic solvent dispersion of zirconium oxide particles is preferably obtained by a method comprising the following processes (a) to (e) which are as follows:

(a) a process for reacting a zirconium salt with an alkali in water to obtain a first aqueous slurry of zirconium oxide particles, (b) a process for filtering, washing and repulping the first aqueous slurry of zirconium oxide particles to obtain a second aqueous slurry of zirconium oxide particles, (c) a process for adding to the second aqueous slurry of zirconium oxide particles one part by mole or more of an organic acid relative to one part by mole of zirconium in the second aqueous slurry, and hydrothermally treating the resultant at a temperature of 170° C. or higher to obtain an aqueous dispersion of zirconium oxide particles, (d) a process for washing the aqueous dispersion of zirconium oxide particles thus obtained, and, (e) a process for replacing water as a dispersion medium of the aqueous dispersion of zirconium oxide particles obtained in the process (d) with at least one alcohol solvent selected from methanol and ethanol.

In particular in the invention, the alcohol dispersion of zirconium oxide particles used as a starting material is preferably such that it contains 20% by weight or more of zirconium oxide particles having a D50 in a range of 1 to 20 nm, and has a transmittance of 15% or more at a wavelength of 400 nm and a transmittance of 80% or more at a wavelength of 800 nm.

Effect of the Invention

According to the method of the invention, there are performed the surface treating process for surface treating an alcohol dispersion of zirconium oxide particles in an alcohol selected from methanol and ethanol with the aforementioned surface treating agent thereby surface treating the zirconium oxide particles followed by the solvent replacing process for replacing the alcohol solvent as a dispersion medium of the alcohol dispersion with an organic solvent other than the aforementioned alcohol, and as a consequence, there is readily and stably obtained an organic solvent dispersion of zirconium oxide particles which contains the zirconium oxide particles in a high content, has a low viscosity, does not undergo gradual increase in viscosity, precipitation of particles or reduction in transparency, and is superior in stability and transparency.

The organic solvent dispersion of zirconium oxide particles according to the invention contains the zirconium oxide particles in a high content as described above, while it has a low viscosity and is superior in stability and transparency, and in addition, they do not suffer deterioration in the desirable properties that the zirconium oxide particles inherently possess, such as a high refractive index. Accordingly, the organic solvent dispersion of zirconium oxide particles of the invention is preferably used in various applications in the field of optics, particularly as a material for an optical composite resin such as an LED sealing resin or an anti-reflection coating.

EMBODIMENTS OF THE INVENTION

The organic solvent dispersion of zirconium oxide particles according to the invention is an organic solvent dispersion of zirconium oxide particles in a content of 20% by weight or more in an organic solvent except methanol and ethanol, wherein the zirconium oxide particles are surface-treated with a surface treating agent comprising a silane coupling agent having the general formula (I)

$$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group, and 12-hydroxystearic acid, and wherein the zirconium oxide particles in the organic solvent have a D50 in a range of 1 to 20 nm, and wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while the increase in the viscosity is 10 mPa·s or less seven days after production as compared to that of the dispersion immediately after production.

In the organic solvent dispersion of zirconium oxide particles according to the invention, the zirconium oxide particles include particles of zirconium oxide as solid solution containing at least one stabilized element selected from aluminum, magnesium, titanium and rare earth metal elements so that they possess crystalline stability. That is, the zirconium oxide particles include so-called stabilized zirconium oxide particles. An example of the rare earth metal elements is yttrium.

The stabilized zirconium oxide particles contain the stabilized element in a range of 20% by mole or less, preferably in a range of 0.1 to 20% by mole, relative to the total of zirconium and the stabilized element.

Hereinafter in the invention, the zirconium oxide includes stabilized zirconium oxide unless otherwise specified.

First, the method for producing the organic solvent dispersion of zirconium oxide particles according to the invention is described.

The method for producing the organic solvent dispersion of zirconium oxide particles according to the invention is a method for producing an organic solvent dispersion of zirconium oxide particles in a content of 20% by weight or more in an organic solvent except methanol and ethanol, wherein the zirconium oxide particles in the organic solvent have a D50 in a range of 1 to 20 nm, and wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while the increase in the viscosity is 10 mPa·s or less seven days after production as compared to that of the dispersion immediately after production.

the method comprising:

a surface treating process for surface treating an alcohol dispersion of zirconium oxide particles in at least one alcohol solvent selected from methanol and ethanol with a surface treating agent comprising a silane coupling agent and 12-hydroxystearic acid thereby surface treating the zirconium oxide particles; and a solvent replacing process for replacing the alcohol solvent that is a dispersion medium of the alcohol dispersion of zirconium oxide particles with the organic solvent except methanol and ethanol, wherein the silane coupling agent has the general formula $$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group.

The alcohol solvent as a dispersion medium of the alcohol dispersion of zirconium oxide particles is at least one selected from methanol and ethanol as described above, and methanol is employed preferably.

According to the invention, the D50 of the zirconium oxide particles in the alcohol dispersion is preferably in a range of 1 to 20 nm, more preferably in a range of 2 to 10 nm so that the resultant organic solvent dispersion has a low viscosity and is superior in transparency.

In the invention, the D50 of zirconium oxide particles refers to a median diameter obtained from the particle distribution of zirconium oxide particles in the dispersion as measured by a dynamic light scattering method.

Also in the invention, the content of zirconium oxide particles in the alcohol dispersion is usually in a range of 1 to 40% by weight, preferably in a range of 5 to 30% by weight so that the zirconium oxide particles are efficiently surface-treated with the surface treating agent comprising the silane coupling agent and 12-hydroxystearic acid.

In particular in the invention, it is preferred that the alcohol dispersion of zirconium oxide particles contains the zirconium oxide particles in a content of 20% by weight or more of which D50 is in a range of 1 to 20 nm, preferably in a range of 2 to 10 nm, has a transmittance of 15% or more at a wavelength of 400 nm, more preferably 30% or more, and 80% or more, more preferably 90% or more at a wavelength of 800 nm, and has a high transparency.

The method for producing the organic solvent dispersion of zirconium oxide particles according to the invention comprises, as described hereinabove, a surface treating process for surface treating an alcohol dispersion of zirconium oxide particles in at least one alcohol solvent selected from methanol and ethanol with a surface treating agent comprising a silane coupling agent having the general formula $$(RO)_n\text{—Si—}X_{4-n} \qquad (I)$$

wherein R is an alkyl group having carbon atoms of 1-4, n is 2 or 3, X is an alkyl, a fluoroalkyl, a vinyl or a (meth) acryloyloxyalkyl group, and 12-hydroxystearic acid thereby surface treating the zirconium oxide particles; and a solvent replacing process for replacing the alcohol solvent that is a dispersion medium of the alcohol dispersion of zirconium oxide particles with the aforementioned organic solvent except methanol and ethanol.

In the silane coupling agent represented by the formula (I) shown above, the alkyl group R having 1 to 4 carbon atoms denotes a methyl group, an ethyl group, a propyl group or a butyl group, and the alkyl group having 3 or 4 carbon atoms may have a form of a straight or branched chain.

In the formula (I) shown above, when X is an alkyl group, it has usually 1 to 20 carbon atoms, preferably 1 to 12 carbon atoms. Thus, examples of such an alkyl group include a methyl group, an ethyl group, a propyl group, a hexyl group, a decyl group, and an undecyl group. The alkyl group having 3 or more carbon atoms may have a form of a straight chain or a branched chain.

Accordingly, the silane coupling agent wherein X is an alkyl group in the formula (I) shown above includes, for example, methyltrimethoxy-silane, methyltriethoxysilane, isobutyltrimethoxysilane, butyl-trimethoxysilane, hexyltrimethoxysilane, decyltrimethoxysilane, butyltriethoxysilane, isobutyltriethoxysilane, hexyltriethoxysilane, octyltriethoxysilane, decyltriethoxysilane, undecyltriethoxysilane, dimethyldimethoxysilane, diethyldimethoxysilane, diethyldiethoxysilane, and the like.

In the formula (I) shown above, when X is a fluorinated alkyl group, it usually has 1 to 18 carbon atoms, preferably 1 to 10 carbon atoms. Accordingly, as examples of such a fluorinated alkyl group are mentioned trifluoromethyl, trifluoroethyl, trifluoropropyl, perfluorooctylethyl group, and the like.

Accordingly, the silane coupling agent wherein X is a fluorinated alkyl group in the formula (I) includes, for example, 3,3,3-trifluoro-propyltrimethoxysilane, perfluorooctylethyltrimethoxysilane, perfluorooctylethyltriethoxysilane, perfluorooctylethyltriisopropoxy-silane, and the like.

In the silane coupling agent represented by the formula (I) shown above, when X is a vinyl group, examples of such a silane coupling agent include vinyltrimethoxysilane, vinyltriethoxysilane and the like.

The silane coupling agent represented by the formula (I) shown above wherein X is a (meth)acryloyloxyalkyl group includes, for example, (meth)acryloyloxymethyltrim ethoxysilane, (meth)acryloyloxymethyl-triethoxysilane, 2-(meth)acryloyloxyethyltrimethoxysilane, 2-(meth)acryloyloxyethyltriethoxysilane, 3-(meth)acryloyloxypropyltrimethoxysilane, 3-(meth)acryloyloxypropyltriethoxysilane, 3-methacryloyloxypropyl methyldimethoxysilane and the like. The (meth)acryloyl means an acryloyl or a methacryloyl.

The silane coupling agent and 12-hydroxystearic acid, each a component constituting the surface treating agent according to the invention, may be added simultaneously to the alcohol dispersion of zirconium oxide particles, or alternatively, any one of the two may be added first and thereafter the other may be added.

When surface treating the alcohol dispersion of zirconium oxide particles, any one or the both of the components of the surface treating agent may be dissolved in an appropriate organic solvent such as the same alcohol solvent as the dispersion medium of the alcohol dispersion of zirconium oxide particles (for convenience, hereinafter sometimes referred to also as an alcohol solvent A), or the same organic solvent as the dispersion medium of the intended organic solvent dispersion of zirconium oxide particles (for convenience, hereinafter sometimes referred to also as an organic solvent S), and the resulting solution may be added to the alcohol dispersion. Alternatively, the surface treating agent may be added to the alcohol dispersion of zirconium oxide particles, and then the organic solvent S may be added to the resulting dispersion.

More specifically, for example, any one of the following processes may be employed in order to surface treating the zirconium oxide particles with the surface treating agent comprising the silane coupling agent and 12-hydroxystearic acid.

(Surface Treating Process 1)

The silane coupling agent and 12-hydroxystearic acid are added as they are to the alcohol dispersion of zirconium oxide particles at an ambient temperature under an atmospheric pressure, or to the alcohol dispersion heated if necessary to a temperature lower than the boiling point of the dispersion medium thereof under an atmospheric pressure, and the resultant is stirred thereby surface treating the zirconium oxide particles with the surface treating agent.

(Surface Treating Process 2)

The silane coupling agent and 12-hydroxystearic acid are dissolved in an appropriate organic solvent, for example, an alcohol solvent A, and the resulting alcohol solution is added to the alcohol dispersion of zirconium oxide particles under an atmospheric pressure at an ambient temperature, or to the alcohol dispersion heated if necessary to a temperature lower than the boiling point of the dispersion medium thereof, and the resultant is stirred thereby treating the alcohol dispersion of zirconium oxide particles thereby surface treating the zirconium oxide particles with the surface treatment agents.

(Surface Treating Process 3)

The silane coupling agent and 12-hydroxystearic acid are dissolved in an appropriate organic solvent, preferably an organic solvent S, and the resulting solution is added to the alcohol dispersion of zirconium oxide particles under an atmospheric pressure at an ambient temperature, or to the alcohol dispersion heated if necessary to a temperature lower than the boiling point of the dispersion medium thereof, and the resultant is mixed and stirred to treat the alcohol dispersion of zirconium oxide particles in the presence of the organic solvent thereby surface treating the zirconium oxide particles with the surface treating agent.

(Surface Treatment Process 4)

As described in the surface treating process 1 to 3, the silane coupling agent and 12-hydroxystearic acid are added to the alcohol dispersion of zirconium oxide particles, and then an organic solvent S is added and stirred to treat the alcohol dispersion of zirconium oxide particles in the presence of the organic solvent S thereby surface treating the zirconium oxide particles with the surface treating agent.

Adding a solution of the surface treating agent dissolved in an organic solvent S or adding an organic solvent S to the alcohol dispersion of zirconium oxide particles as in the above-mentioned surface treating process 3 and 4 means changing the dispersion medium of the dispersion of zirconium oxide particles to a mixture of the alcohol and the organic solvent, and accordingly, it means treating the dispersion of zirconium oxide particles whose dispersion medium is the mixture of the alcohol and the organic solvent S with the surface treating agent thereby surface treating the zirconium oxide particles with the surface treating agent.

Thus, a process in which the alcohol dispersion of zirconium oxide particles is treated with the surface treating agent in the presence of the organic solvent, i.e., a process in which the dispersion of zirconium oxide particles of which dispersion medium is a mixture of the alcohol and the organic solvent S is treated with the surface treating agent is one of the surface treating processes employed in the in the invention.

According to the invention, the surface treating agent is used so that it comprises 1 to 100 parts by weight of the silane coupling agent and 1 to 20 parts by weight of 12-hydroxystearic acid, each relative to 100 parts by weight of the zirconium oxide particles in the alcohol dispersion of zirconium oxide particles.

In particular according to the invention, the silane coupling agent is used preferably in an amount in a range of 1 to 20 parts by weight, more preferably in a range of 2 to 15 parts by weight, relative to 100 parts by weight of zirconium oxide particles in the alcohol dispersion of zirconium oxide particles.

Similarly, 12-hydroxystearic acid is used preferably in an amount in a range of 1 to 15 parts by weight, more preferably in a range of 2 to 10 parts by weight, relative to 100 parts by weight of zirconium oxide particles in the alcohol dispersion of zirconium oxide particles.

It is preferred in the invention that the surface treating agent consists of the silane coupling agent and 12-hydroxystearic acid. In other words, it is preferred in the invention that the surface treating agents do not include any other surface treating agent than the silane coupling agent and 12-hydroxystearic acid.

According to the invention, the surface treating agent is used so that it comprises the silane coupling agent in a range of 1 to 100 parts by weight and 12-hydroxystearic acid in a range of 1 to 20 parts by weight, and the total amounts to a range of 2 to 120 parts by weight, each relative to 100 parts by weight of the zirconium oxide particles in the alcohol dispersion of zirconium oxide particles, thereby the intended organic solvent dispersion of zirconium oxide particles which is superior in transparency and has a low viscosity is obtained.

Nevertheless, as the ratio of the surface treating agent in the resulting dispersion increases, the ratio of zirconium oxide particles in the resulting dispersion relatively decreases, and as a consequence, a reduction in the refractive index of the resulting organic solvent dispersion occurs. Therefore, when an application requiring a high refractive index is intended, it is preferred that surface treating agent is used so that it comprises the silane coupling agent in a range of 1 to 20 parts by weight and 12-hydroxystearic acid in a range of 1 to 15 parts by weight, and the total amounts is in a range of 2 to 35 parts by weight, each relative to 100 parts by weight of zirconium oxide particles in the alcohol dispersion. It is particularly preferred that the surface treating agent is used so that it comprises the silane coupling agent in a range of 2.5 to 10 parts by weight and 12-hydroxystearic acid in a range of 2.5 to 10 parts by weight, and the total amount is in a range of 5 to 20 parts by weight.

According to the invention, the intended organic solvent dispersion of zirconium oxide particles is obtained in this way by performing the surface treating process for surface treating the zirconium oxide particles in the alcohol dispersion with the surface treating agent and the solvent replacing process for replacing the alcohol solvent as a dispersion medium of the alcohol dispersion of the thus surface-treated zirconium oxide particles with the aforementioned organic solvent except methanol and ethanol.

According to the invention, as one method, the solvent replacing process may be performed after performing the surface treating process, or as an alternative method, the surface treating process may be performed while simultaneously performing the solvent replacing process.

As an example of the former method, as described hereinbefore, the silane coupling agent and 12-hydroxystearic acid are added to the alcohol dispersion of zirconium oxide particles at an ambient temperature under atmospheric pressure, and the resultant is stirred to surface treat the zirconium oxide particles with the surface treating agent, and then the organic solvent is added to the resulting alcohol dispersion continuously or intermittently to replace the alcohol solvent as a dispersion medium of the alcohol dispersion with the organic solvent, thereby obtaining the intended organic solvent dispersion.

As the alternative method, for example, similarly to the aforementioned surface treating process 3 and 4, the silane coupling agent and 12-hydroxystearic acid are dissolved in an organic solvent S, and the resulting solution is added to the alcohol dispersion of zirconium oxide particles, or the silane coupling agent and 12-hydroxystearic acid added to the alcohol dispersion of zirconium oxide particles together with an organic solvent S, and then the resulting dispersion of zirconium oxide particles is subjected in the presence of the organic solvent, i.e., the dispersion of zirconium oxide particle of which dispersion medium is a mixture of the alcohol and the organic solvent S, to surface treatment of zirconium oxide particles with the surface treating agent, followed by solvent replacement, i.e., removal of the alcohol from the resulting dispersion, thereby obtaining the intended organic solvent dispersion. This process is one of the processes employed preferably in the solvent replacing process in the invention.

As an example of the alternative process, the silane coupling agent and 12-hydroxystearic acid are dissolved in an organic solvent S, and the resulting solution is added to the alcohol dispersion of zirconium oxide particles, or the silane coupling agent and 12-hydroxystearic acid are added to the alcohol dispersion of zirconium oxide particles together with an organic solvent S, and then the resulting dispersion of zirconium oxide particles is subjected, in the presence of the organic solvent, i.e., the dispersion of zirconium oxide particle of which dispersion medium is a mixture of the alcohol and the organic solvent S, to surface treating the zirconium oxide particles with the surface treating agent, while removing the alcohol from the dispersion to effect solvent replacement thereby also obtaining the intended organic solvent dispersion.

According to the invention, the organic solvent as a dispersion medium of the organic solvent dispersion of zirconium oxide particles is preferably an organic solvent which is more lipophilic than methanol and ethanol. Such a lipophilic organic solvent may, for example, be alcohols each having 3 or more carbon atoms, glycols, ketones, esters, ethers, hydrocarbons, halogenated carbons, carboxylic acid amides, sulfoxides, and the like.

The alcohol having 3 or more carbon atoms includes propanols such as isopropanol and butanols such as 1-butanol; the glycol includes ethylene glycol and propylene glycol; the ketone includes methyl ethyl ketone (MEK), diethyl ketone, methyl isobutyl ketone (MIBK), methyl amylketone, and cyclohexanone; the ester includes ethyl acetate, butyl acetate, propylene glycol monomethyl ether acetate, diethylene glycol monoethyl ether acetate, methyl acrylate and methyl methacrylate; the ether includes dibutyl ether, propylene glycol monomethyl ether, and dioxane; the hydrocarbon includes n-hexane, cyclohexane, toluene, xylene, and solvent naphtha; the halogenated hydrocarbon includes carbon tetrachloride, dichloroethane, and chlorobenzene; the carboxylic acid amides includes dimethylformamide, N,N-dimethylacetoamide, N,N-trimethylpropionamide, and N-methylpyrrolidone; and the sulfoxide includes dimethylsulfoxide and diethylsulfoxide.

According to the invention, particularly preferred lipophilic organic solvents include at least one selected from methyl isobutyl ketone, methyl ethyl ketone, butanol, propanol, propylene glycol monomethyl ether, toluene, dimethylsulfoxide, N,N-dimethylacetoamide, N,N-trimethylpropionamide, butyl acetate, and ethylene glycol.

In the invention, when the alcohol solvent as a dispersion medium of the alcohol dispersion of zirconium oxide particles is to be replaced with the above-mentioned lipophilic organic solvent other than the alcohol solvent, a distillation replacing method or an ultrafiltration concentration replacing method, which methods are well known per se, are employed.

The distillation replacing method is a method in which the alcohol dispersion of zirconium oxide particles surface-treated with the surface treating agent as described above is heated to the boiling point or more of the alcohol as the dispersion medium of the alcohol dispersion to distill the alcohol as a dispersion medium of the alcohol dispersion out of the dispersion while adding an intended organic solvent to the dispersion. For example, the alcohol dispersion of zirconium oxide particles surface-treated with the surface treating agent is heated under atmospheric pressure or reduced pressure to distill the alcohol solvent, while adding an organic solvent at a rate preferably equal to the relevant distillation rate, thereby replacing the alcohol solvent as a dispersion medium of the alcohol dispersion of zirconium oxide particles with the intended organic solvent.

As an alternative method, the surface treating agent is dissolved in an organic solvents as described in the surface treating process 3 and 4, and the resulting solution is added to the alcohol dispersion of zirconium oxide particles, or the surface treating agent and the organic solvent are added to the alcohol dispersion of zirconium oxide particles and the zirconium oxide particles are subjected in the presence of the organic solvent to surface treatment with the surface treating agent, and thereafter heated under atmospheric pressure or reduced pressure, to distill the alcohol as a dispersion medium of the alcohol dispersion off, thereby also replacing the alcohol solvent as a dispersion medium of the alcohol dispersion of the zirconium oxide particles with the organic solvent.

Accordingly, when the dispersion medium of the alcohol dispersion of zirconium oxide particles is to be replaced with an organic solvent by means of such a distillation replacing method, the organic solvent used preferably has a boiling point which is almost equal to or higher than that of the alcohol under the distillation condition.

The ultrafiltration concentration replacing method is a method in which the alcohol dispersion of zirconium oxide particles is subjected to ultrafiltration so that the alcohol solvent permeates through the membrane thereby removing the alcohol solvent from the alcohol dispersion while adding an intended organic solvent to the dispersion thereby replacing the alcohol solvent as a dispersion medium of the alcohol dispersion of zirconium oxide particles with the organic solvent.

For example, the alcohol dispersion of zirconium oxide particles is treated with the surface treating agent, and thereafter the resulting alcohol dispersion is pumped to an ultrafiltration module so that the alcohol solvent permeates through the membrane thereby removing the alcohol solvent from the dispersion, while adding an intended organic solvent stepwise or continuously to the dispersion, thereby replacing the alcohol solvent as a dispersion medium of the alcohol dispersion of zirconium oxide particles with the organic solvent.

As set forth hereinabove, the method of the invention uses as a starting material the alcohol dispersion of zirconium oxide particles which preferably contains the zirconium oxide particles in a content of 20% by weight or more of which D50 is in a range of 1 to 20 nm, preferably 2 to 10 nm, and has a transmittance of 15% or more, preferably 30% or more, at a wavelength of 400 nm, and has a transmittance of 80% or more, preferably 90% or more, at a wavelength of 800 nm. The method of the invention then performs the surface treating process for surface treating the zirconium oxide particles in the alcohol dispersion medium with the surface treating agent, and then the solvent replacing process for replacing the alcohol solvent as a dispersion medium of the alcohol dispersion of zirconium oxide particles thus surface-treated with the aforementioned organic solvent except methanol and ethanol. In this way, the method of the invention is hardly accompanied by agglomeration of zirconium oxide particles, but provides an organic solvent dispersion of zirconium oxide particle which has usually a content of zirconium oxide particles of 20% by weight or more, preferably 20 to 50% by weight, of which D50 is in a range of 1 to 20 nm, preferably in a range of 2 to 20 nm, most preferably in a range of 2 to 10 nm, and which has a transmittance of 10% or more at a wavelength of 400 nm and a transmittance of 80% or more at a wavelength of 800 nm, and has a viscosity of 10 mPa·s or less at 25° C. immediately after production while the increase in the viscosity is 10 mPa·s or less seven days after production as compared to that of the dispersion immediately after production.

Thus, according to the method of the invention, after the zirconium oxide particles in the alcohol dispersion used as a starting material are surface-treated with the surface treating agent, or while the zirconium oxide particles in the alcohol dispersion used as a starting material are surface-treated with the surface treating agent, the alcohol solvent or the dispersion medium of the alcohol dispersion is replaced with the aforementioned organic solvent except methanol and ethanol, thereby a small dispersion diameter D50 of the zirconium oxide particles in the alcohol dispersion is taken over to the resulting organic solvent dispersion of zirconium oxide particles.

As a result, an organic solvent dispersion of zirconium oxide particles which has the zirconium oxide particles of a small D50 and which has a low viscosity and high stability and transparency is obtained.

Thus, the organic solvent dispersion of zirconium oxide particles according to the invention contains the zirconium oxide particles in a high content, has a low viscosity, while it is superior in stability and transparency.

The organic solvent dispersion of zirconium oxide particles according to the invention contains fine particles of zirconium oxide of which D50 is within the range of 1 to 20 nm in a content as high as 20% by weight or more, while it has a viscosity of 10 mPa·s or less at 25° C. immediately after production with the increase in the viscosity of 10 mPa·s or less, preferably 5 mPa·s or less, seven days after production as compared to that of the dispersion immediately after production. Accordingly, the organic solvent dispersion of zirconium oxide particles of the invention does not suffer increase in viscosity, precipitation of particles, or reduction in transparency, and thus is superior in stability. In addition, it has a transmittance of 10% or more at a wavelength of at 400 nm, and a transmittance of 80% or more at a wavelength of at 800 nm, thus having superior transparency.

The alcohol dispersion of zirconium oxide particles used in the surface treating process in the method for producing an organic solvent dispersion of zirconium oxide particles according to the invention may be one which is commercially available. However, according to the invention, there is preferably used such an alcohol dispersion of zirconium oxide particles which is obtained by a method in which an aqueous dispersion of zirconium oxide particles is obtained using a zirconium salt as a starting material, and then the dispersion medium of the aqueous dispersion or water is replaced with the alcohol solvent.

The method for producing the alcohol dispersion of zirconium oxide particles which is preferably employed in the surface treating process in the method of the invention is described below.

The alcohol dispersion of zirconium oxide particles which is preferably employed in the surface treating process in the method of the invention is obtained by a method comprising:

(a) a process for reacting a zirconium salt with an alkali in water to obtain a first aqueous slurry of zirconium oxide particles, (b) a process for filtering the first aqueous slurry of zirconium oxide particles, washing and repulping to obtain a second aqueous slurry of zirconium oxide particles, (c) a process for adding to the second aqueous slurry of zirconium oxide particles one part by mole or more of an organic acid relative to one part by mole of zirconium in the second water slurry, and hydrothermally treating the resultant at a temperature of 170° C. or more to obtain an aqueous dispersion of zirconium oxide particle, (d) a process for washing the aqueous dispersion of zirconium oxide particles thus obtained, and, (e) a process for replacing water as a dispersion medium of the aqueous dispersion of zirconium oxide particles obtained in the step (d) with at least one alcohol solvent selected from methanol and ethanol.

The resulting aqueous dispersion of zirconium oxide particles may be concentrated if necessary in the process (d).

As described above, the processes (a) to (d) are conducted, starting from a zirconium salt, to obtain an aqueous dispersion of zirconium oxide particles which has a content of 20% by weight or more of zirconium oxide particles of which D50 is in a range of 1 to 20 nm, preferably 2 to 10 nm, has a transmittance of 30% or more at a wavelength 400 nm and 90% or more at a wavelength of 800 nm, and has a viscosity of 20 mPa·s or less, preferably 10 mPa·s or less, at a temperature of 25° C. Subsequently, the process (e) is conducted for replacing water as a dispersion medium of the resulting aqueous dispersion of zirconium oxide particles with the aforementioned alcohol solvent, thereby to obtain an alcohol dispersion of zirconium oxide particles which is employed preferably in the method for producing an organic solvent dispersion of zirconium oxide particles according to the invention. The alcohol dispersion of zirconium oxide particles thus obtained which is employed preferably in the method for producing an organic solvent dispersion of zirconium oxide particles according to the invention has the zirconium oxide particles in a content of 20% by weight or more of the zirconium oxide particles of which D50 is in a range from 1 to 20 nm, preferably 2 to 10 nm, has a transmittance of 15% or more, preferably 30% or more at a wavelength of at 400 nm and 80% or more, preferably 90% or more at a wavelength of at 800 nm, and has a viscosity at a temperature of 25° C. of 20 mPa·s or less, preferably 10 mPa·s or less.

When the alcohol dispersion of zirconium oxide particles used in the surface treating process in the method of the invention is an alcohol dispersion of stabilized zirconium oxide particles, such an alcohol dispersion of stabilized zirconium oxide particles is obtained similarly to the method described above but changing the zirconium salt to a zirconium salt and a stabilizing element.

Thus, the alcohol dispersion of stabilized zirconium oxide particles is obtained by a method comprising:

(a) a process for reacting a zirconium salt and a salt of stabilizing element with an alkali to obtain a first aqueous slurry of particles of coprecipitates of zirconium oxide and the stabilizing element, (b) a process for filtering, washing and repulping the first slurry to obtain a second aqueous slurry of the particles of coprecipitates of zirconium oxide and the stabilizing element, (c) a process for adding to the second aqueous slurry of the particles of coprecipitates of zirconium oxide and the stabilizing element one part by mole or more of an organic acid relative to one part by mole of the total of zirconium and the stabilizing element in the second aqueous slurry and hydrothermally treating the resultant at a temperature of 170° C. or more to obtain an aqueous dispersion of stabilized zirconium oxide particles, (d) a process for washing the aqueous dispersion of stabilized zirconium oxide particles thus obtained, and (e) a process for replacing water as a dispersion medium of the aqueous dispersion of stabilized zirconium oxide particles obtained in the process (d) with at least one alcohol solvent selected from methanol and ethanol.

The resulting water dispersion of stabilized zirconium oxide particles may be concentrated if necessary in the process (d).

As stated above, the processes (a) to (d) are conducted, starting from a zirconium salt and a salt of a stabilizing element, to obtain an aqueous dispersion of stabilized zirconium oxide particles which has a content of stabilized zirconium oxide particles of 20% by weight or more, has stabilized zirconium oxide particles of D50 in a range of 1 to 20 nm, preferably 2 to 10 nm, has a transmittance of 30% or more at a wavelength 400 nm and 90% or more at a wavelength of 800 nm, and has a viscosity of 20 mPa·s or less, preferably 10 mPa·s or less, at a temperature of 25° C. Subsequently, the process (e) is conducted for replacing water as the dispersion medium of the resulting aqueous dispersion of stabilized zirconium oxide particles with the aforementioned alcohol solvent, thereby to obtain an alcohol dispersion of stabilized zirconium oxide particles which is employed preferably in the method for producing an organic solvent dispersion of zirconium oxide particles according to the invention. The alcohol dispersion of stabilized zirconium oxide particles thus obtained which is employed preferably in the method for producing an organic solvent dispersion of zirconium oxide particles according to the invention has a content of the stabilized zirconium oxide particles of 20% by weight or more, has the stabilized zirconium oxide particles of D50 in a range from 1 to 20 nm, preferably 2 to 10 nm, has a transmittance of 15% or more, preferably 30% or more at a wavelength of at 400 nm and 80% or more, preferably 90% or more at a wavelength of at 800 nm, and has a viscosity at a temperature of 25° C. of 20 mPa·s or less, preferably 10 mPa·s or less.

The coprecipitate of zirconium oxide and a stabilizing element means a coprecipitate of zirconium oxide and neutralized products of the salt of the stabilizing element obtained by reacting the zirconium salt and the salt of the stabilizing element with an alkali in water.

As described above, starting from a zirconium salt, there is obtained an alcohol dispersion of zirconium oxide particles which has a zirconium oxide content of 20% by weight or more, has the zirconium oxide particles of D50 in a range of 1 to 20 nm, has a transmittance of 15% or more at a wavelength of at 400 nm and a transmittance of 80% or more at a wavelength of at 800 nm, and is superior in transparency. Thus, according to the invention, the use of such an alcohol dispersion of zirconium oxide particles readily and stably provides the intended organic solvent dispersion of zirconium oxide particles.

The above-mentioned zirconium salt is not limited particularly. For example, water-soluble salts such as nitrates, acetates, and chlorides may be used, and zirconium oxychloride is employed preferably. The alkalis used preferably are alkaline metal hydroxides such as sodium hydroxide and potassium hydroxide and ammonia.

The salt of stabilizing element is not limited particularly either. Water-soluble salts such as chlorides and nitrates are usually used. For example, when the stabilizing element is aluminum, then aluminum chloride is used preferably, and when the stabilizing element is yttrium, then yttrium chloride is used preferably. The stabilizing element is used usually in an amount in a range of 1 to 20% by mole relative to the amount of zirconium element.

The temperature at which the zirconium salt or the zirconium salt and the salt of stabilizing element are reacted with an alkali in water as described above is not limited particularly, and it is usually within the range of 10 to 50° C., preferably within the range of 15 to 40° C. Further, the zirconium salt or the zirconium salt and the salt of stabilizing element may be reacted with an alkali in water, for example, by any one of the methods which are as follows: a method in which an aqueous alkali solution is added to an aqueous solution of the zirconium salt or an aqueous solution of a mixture of the zirconium salt and the salt of stabilizing element; a method in which an aqueous solution of the zirconium salt or an aqueous solution of a mixture of the zirconium salt and the salt of stabilizing element is added to an aqueous alkali solution; and a method in which an aqueous solution of the zirconium salt or an aqueous solution of a mixture of the zirconium salt and the salt of stabilizing element and an aqueous alkali solution are added simultaneously to water in a precipitation reaction vessel (in which the water has been in advance put). However, the method in which an aqueous solution of the zirconium salt or an aqueous solution of a mixture of the zirconium salt and the salt of stabilizing element and an aqueous alkali solution are added simultaneously to water which has been in advance put in a precipitation reaction vessel, namely, a simultaneous neutralization method is preferred.

The concentration of the aqueous solution of zirconium salt, for example, the concentration of an aqueous solution of zirconium oxychloride, is preferably 2.4 mole/L or less, and the concentration of aqueous alkali solution is preferably 10 mole/L or less.

When the zirconium salt or the zirconium salt and the salt of stabilizing element are reacted in water with an alkali to obtain a first aqueous slurry of the zirconium oxide particles or a first aqueous slurry of particles of coprecipitates of zirconium oxide and the stabilizing element, respectively, and subsequently the first aqueous slurry is subjected to filtration, washing and then repulping in water to obtain a second aqueous slurry, the second aqueous slurry preferably has an electric conductivity of 500 µS/cm or less.

Generally, a by-product is formed when a zirconium salt is reacted and neutralized with an alkali in water. For example, when zirconium oxychloride, a zirconium salt, is reacted and neutralized in water with sodium hydroxide to prepare an aqueous slurry of zirconium oxide particles, sodium chloride is formed as a by-product in the slurry. In a case when the above-mentioned by-product, i.e., sodium chloride, contained in the slurry obtained is not sufficiently removed therefrom, but remains therein, the zirconium oxide particles are not dispersed sufficiently in the slurry, and as a result, a highly transparent dispersion of zirconium oxide particles is not obtained even when an organic acid is added to the slurry and the slurry is hydrothermally treated.

When the first aqueous slurry is filtered and washed, and the resulting cake is repulped in water to obtain a second aqueous slurry, the cake may be added to water and then agitated using a stirrer to obtain the second slurry. However, the second aqueous slurry may also be obtained by repulping the cake in water by means of wet media dispersion such as beads mill as well as ultrasonication and high pressure homogenization.

In this way, the second aqueous slurry having a content of zirconium oxide particles or a content of particles of coprecipitates of zirconium oxide and a stabilizing element in a range of 1 to 20% by weight, preferably 1 to 10% by weight is obtained.

Then, according to the invention, one part by mole or more of an organic acid in relation to one part by mole of the zirconium or the total of the zirconium and the stabilizing element in the aqueous slurry is added to the second aqueous slurry thus obtained, and then the resulting slurry is hydrothermally treated a temperature of 170° C. or more.

The organic acid is used so that the zirconium oxide particles or the particles of coprecipitates of zirconium oxide and the stabilizing element in the second aqueous slurry repel electrically to each other thereby being dispersed, i.e., being acid deflocculated. According to the invention in particular, the hydrothermal treatment of the second aqueous slurry is conducted under severe conditions thereby the zirconium oxide particles or the particles of coprecipitates of the zirconium oxide and the stabilizing element are deflocculated more effectively.

Such an organic acid as mentioned above is preferably a carboxylic acid or a hydroxycarboxylic acid, and such the carboxylic acid or hydroxycarboxylic acid may be a salt. Specifically such an organic acid may, for example, be a monocarboxylic acid such as formic acid, acetic acid and propionic acid and its salt, a polybasic acid such as oxalic acid, malonic acid, succinic acid, fumaric acid and maleic acid and its salt, and a hydroxycarboxylic acid such as lactic acid, malic acid, tartaric acid, citric acid and gluconic acid and its salt. The carboxylic acid salt and hydroxycarboxylic acid salt which are employed preferably may, for example, be an alkaline metal salt such as a sodium salt and a potassium salt.

The organic acid is employed in an amount usually of one part by mole or more, preferably in a range of 1 to 5 parts by moles, more preferably in a range of 1 to 3 parts by moles, relative to one part by mole of zirconium or the total of zirconium and the stabilizing element in the second aqueous slurry to be subjected to hydrothermal treatment as described above. When the amount of the organic acid is less than 1 part by mole relative to one part by mole of zirconium or the total of zirconium and the stabilizing element in the second aqueous slurry, the resulting aqueous dispersion of zirconium oxide particles may not only has an insufficient transparency but also has a high viscosity. On the other hand, an amount of the organic acid exceeding 5 parts by mole relative to one part by mole of zirconium or the total of zirconium and the stabilizing element in the second aqueous slurry results in no correspondingly enhanced effect, and is not advantageous economically, either.

Then, the second aqueous slurry of zirconium oxide particles or the particles of coprecipitates of zirconium oxide and the stabilizing element which contains the organic acid is subjected to hydrothermal treatment. The temperature at which the hydrothermal treatment is carried out is usually 170° C. or more, preferably in a range of 170° C. to 230° C. When the temperature is less than 170° C., the resulting aqueous dispersion of zirconium oxide particles may not only have an insufficient transparency, but also contain sedimentary and coarsely agglomerated particles. In addition, it may have a high viscosity.

The time period for which the hydrothermal treatment is conducted is usually one hour or longer, preferably three hours or longer. When the time period is shorter than one hour, the resulting aqueous dispersion zirconium oxide may not only have an insufficient transparency but also contain sedimentary and coarsely agglomerated particles, failing to provide the intended aqueous dispersion of zirconium oxide particles having a high transparency. While the hydrothermal treatment may be prolonged with no limitation, no particular corresponding advantage is obtained; the period of 10 hours or less is usually sufficient.

The aqueous dispersion of zirconium oxide particles thus obtained may be washed by means of ion exchange using an ion exchange resin, diffusion dialysis using a semipermeable membrane, electric dialysis, ultrafiltration using an ultrafiltration membrane. Among these methods, washing by ultrafiltration using an ultrafiltration membrane is preferred in the invention, although the washing means is not particularly limited thereto.

The aqueous dispersion of zirconium oxide particles thus washed may be concentrated by means of evaporation concentration using a rotary evaporator, concentration by ultrafiltration using an ultrafiltration membrane. While the concentration means is not limited particularly, the concentration by ultrafiltration using an ultrafiltration membrane is preferred.

According to the invention, it is particularly preferred that the aqueous dispersion of zirconium oxide particles obtained by the hydrothermal treatment is concentrated, while simultaneously being washed, by using an ultrafiltration membrane. That is, the aqueous dispersion is concentrated by ultrafiltration, the resultant concentrate is diluted by adding thereto water, washed, and the resultant slurry is again subjected to ultrafiltration. In this way, the aqueous dispersion of zirconium oxide particles obtained by the hydrothermal treatment is concentrated by repeatedly concentrating and diluting the dispersion by the ultrafiltration, while removing any remaining by-produced salts together with water repeatedly, thereby obtaining an aqueous dispersion of zirconium oxide particles which has a zirconium oxide content of 20% by weight or more and also has a high transparency and a low viscosity.

However, the upper limit of zirconium oxide content of the aqueous dispersion of zirconium oxide particles obtained by the method described above is usually 50% by weight, preferably 40% by weight. The aqueous dispersion of zirconium oxide particles having a zirconium oxide content exceeding 50% by weight has a high viscosity, and eventually loses fluidity and gels.

As described above, the zirconium salt is subjected to heat or alkali hydrolysis in water to provide an aqueous slurry of zirconium oxide particles, and then the aqueous slurry thus obtained is subjected to hydrothermal treatment in the presence of the organic acid mentioned hereinbefore, and the resulting aqueous dispersion of zirconium oxide particles is washed, and concentrated if necessary, thereby providing an aqueous dispersion of zirconium oxide particles which has the zirconium oxide particles in a content of 20% by weight or more, has the zirconium oxide particles of D50 in the range of 1 to 20 nm, preferably 2 to 10 nm, and has a transmittance of 30% or more at a wavelength of 400 nm and a transmittance of 90% or more at a wavelength of 800 nm, and a viscosity of 20 mPa·s or less, preferably 10 mPa·s or less, at a temperature of 25° C.

Then, the water as a dispersion medium of the aqueous dispersion of zirconium oxide particles thus obtained is replaced with the aforementioned alcohol solvent, thereby providing an alcohol dispersion of zirconium oxide particles of which dispersion medium is the alcohol solvent, and which has a zirconium oxide particles content is 20% by weight or more, a transmittance of 15% or more at a wavelength at 400 nm, preferably 30% or more, and a transmittance of 80% or more, preferably 90% or more, at a wavelength of 800 nm, and a viscosity of 20 mPa·s or less, preferably 10 mPa·s or less, at a temperature of 25° C.

To replace the water as a dispersion medium of the aqueous dispersion of zirconium oxide particles with the alcohol solvent, a method may be employed in principle which is similar to the aforementioned method for replacing the alcohol solvent as a dispersion medium of the alcohol dispersion of zirconium oxide particles with the aforementioned lipophilic organic solvent.

As examples of the methods, the aqueous dispersion is treated using a rotary evaporator to remove water and then the alcohol solvent is newly added, or the aqueous dispersion is subjected to ultrafiltration to remove water as a dispersion medium to obtain a concentrated slurry, which is then diluted by adding the alcohol solvent and then subjected again to ultrafiltration, and thus, filtration and dilution are repeated in this way to replace water as the original dispersion medium with the alcohol solvent thereby obtaining an alcohol dispersion of zirconium oxide particles of which dispersion medium is the alcohol solvent.

The alcohol dispersion of zirconium oxide particles thus obtained may be subjected if necessary to dispersion treatment by means of wet media dispersion such as beads mill as well as ultrasonication and high pressure homogenization.

EXAMPLES

The following Reference Examples are examples of preparation of aqueous dispersions and alcohol dispersions of zirconium oxide particles. In these Reference Examples, ultrafiltration was conducted using "Microza" manufactured by Asahi Kasei Chemicals Corporation (Model ACP-0013, molecular weight cutoff 13000).

The following Examples and Comparative Examples are examples of preparation of organic solvent dispersions of zirconium oxide particles using the alcohol dispersions of zirconium oxide particles obtained in the following Reference Examples.

The dispersion diameters of zirconium oxide particles, i.e., the sizes (diameters) of zirconium oxide particles in the aqueous dispersions and alcohol dispersions of zirconium oxide particles of the following Reference Examples as well as the organic solvent dispersions of the following Examples and Comparative Examples, the turbidimetric transmittance, the transmittances at wavelengths of 400 nm and 800 nm and the viscosities of the organic solvent dispersions are measured as described below.

The dispersion diameter of zirconium oxide particles was measured by a dynamic light scattering method (Model UPA-UT manufactured by NIKKISO Co., Ltd.).

The turbidimetric transmittance was measured using a haze meter (Model NDH4000 manufactured by NIPPON DENSHOKU INDUSTRIES Co., LTD.) by filling the cell having an optical path length of 10 mm with ion exchange water to measure the total light transmittance $T_0$ (blank level) and also filling the cell with the dispersion to measure the light transmittance T, and then calculating $(T/T_0) \times 100$.

The transmittances at wavelengths of 400 nm and 800 nm were measured using a visible-ultraviolet spectrophotometer (Model V-570 manufactured by JASCO Corporation) by filling the cell having an optical path length of 10 mm with the dispersion.

The viscosity was measured using a turning fork vibration SV viscometer (Model SV-1A manufactured by A&D Company, Limited (measurable viscosity ranging from 0.3 to 1000 mPa·s)).

The abbreviations below stand for the following organic solvents.
MEK: Methyl ethyl ketone
MIBK: Methyl isobutyl ketone
IPA: Isopropyl alcohol
PGME: Propylene glycol monomethyl ether
DMAC: N,N-dimethylacetamide
DMSO: Dimethylsulfoxide
EG: Ethylene glycol
DMIB: N,N-trimethylpropionamide Reference Example 1

(Preparation of Aqueous Dispersion of Zirconium Oxide Particles (I))

90 L of mixed aqueous solution of 0.6 mol/L zirconium oxychloride and 0.03 mol/L yttrium chloride, and 68 L of 1.9 mol/L aqueous solution of sodium hydroxide were prepared.

The mixed aqueous solution of zirconium oxychloride and yttrium chloride, and the aqueous solution of sodium hydroxide were simultaneously poured into a precipitation reaction vessel in which 82 L of pure water had been previously put so that the zirconium oxychloride and yttrium chloride were simultaneously neutralized and coprecipitated to provide a first aqueous slurry of resulting particles of coprecipitates of zirconium oxide and yttrium. The first aqueous slurry was filtered, washed, and repulped in pure water to provide 60 L of second aqueous slurry having a solid content of 11% by weight in terms of total of zirconium oxide and yttrium oxide. The second slurry was found to have an electrical conductivity of 70 μS/cm.

4.2 kg of acetic acid (1.3 parts by moles relative to 1 part by moles of the total of zirconium and yttrium in the slurry) was added to the second aqueous slurry, and the resultant slurry was hydrothermally treated for 3 hours at 190° C. to provide a transparent aqueous dispersion. The transparent dispersion was washed and concentrated using an ultrafiltration membrane to provide a 30% by weight aqueous dispersion of particles of zirconium oxide solid solution containing 4.8 mol % of yttrium (I).

The thus obtained aqueous dispersion of particles of zirconium oxide (I) was found to have a transmittance of 59% at a wavelength of 400 nm and a transmittance of 97% at a wavelength of 800 nm, and a viscosity of 6 mPa·s at a temperature of 25° C.

Water was removed from the aqueous dispersion of zirconium oxide particles (I), and the zirconium oxide particles obtained were dried. The powder of zirconium oxide particles obtained thus was observed with a TEM (transmission electron microscope). It was found that the zirconium oxide particles had an average primary particle diameter of about 3 nm.

On the other hand, the zirconium oxide particles in the aqueous dispersion of zirconium oxide particles (I) were found to have a dispersion diameter of D50 of 3 nm. Accordingly, it was found that the zirconium oxide particles hardly agglomerated in the aqueous dispersion obtained.

(Preparation of Methanol Dispersion of Zirconium Oxide (II))

10 Kg of the aqueous dispersion of zirconium oxide (I) was concentrated using an ultrafiltration membrane, while the same amount of methanol as the amount of the filtrate obtained was added to the concentrated dispersion thus obtained. In this way, the dispersion was concentrated while it was diluted with methanol simultaneously and consecutively in parallel thereby maintaining the content of zirconium oxide particles in the dispersion at 30% by weight while the dispersion medium of the dispersion, i.e., water, was replaced with methanol, to provide a methanol dispersion of particles of zirconium oxide solid solution containing 4.8 mol % of yttrium (II). The methanol used for the dilution amounted to 90 L.

The methanol dispersion of zirconium oxide particles (II) thus obtained was found to have a transmittance of 43% at a wavelength of 400 nm, and a transmittance of 93% at a wavelength of 800 nm, and a viscosity of 2 mPa·s at a temperature of 25° C.

Methanol was removed from the methanol dispersion of zirconium oxide particles (II), and the zirconium oxide particles obtained were dried. The powder of zirconium oxide particles was observed with a TEM (transmission electron microscope) to show that the particles had an average primary particle diameter of about 3 nm.

On the other hand, the zirconium oxide particles in the methanol dispersion (II) had a dispersion diameter of D50 of 3 nm. Accordingly, it was found that zirconium oxide particles hardly agglomerated in the methanol dispersion obtained.

The displacement organic solvent used, surface treating agent used, surface treatment temperature employed, and solid content and content of zirconium oxide particles of the organic solvent dispersion obtained and solvent displacement rates in the organic solvent dispersions obtained in the following Examples 1 to 38 and Comparative Examples 1 to 23 are shown in Tables 1, 2, 5, and 6. The tubidimetric transmittance and transmittance at a wavelength of 400 nm and 800 nm of organic solvent dispersion obtained, and particle size distribution and viscosity of organic solvent dispersion obtained are shown in Tables 3, 4, 7, and 8. The solvent displacing process employed is described in Examples 1, 2, 3, and 4.

The solid content, content of zirconium oxide particles, and solvent displacement rate are determined as follows.
Solid content (S):

When W parts by weight of dispersion obtained were put on a drying saucer, and dried to provide w parts by weight of dried product, the solid content S is determined by the following equation:

$$S = (w/W) \times 100.$$

Content of Zirconium Oxide Particles (T):

As the content of zirconium oxide particles is a proportion of zirconium oxide particles in the solid content of the dispersion obtained, it is determined by the following equation:

$$T = S \times 100/(100+p)$$

when the amount of surface treating agent used is p parts by weight in relation to 100 parts by weight of zirconium oxide particles.
Solvent Displacement Rate:

The dispersion obtained was dissolved in deuterated chloroform to prepare a sample, which was subjected to measurement of one-dimensional NMR spectrum of protons using a nuclear magnetic resonance apparatus (AV400M manufactured by Bruker BioSpin AG). Based on the NMR spectrum obtained, the area ratio (ratio of amount of substance) of peak of each solvent was converted to a mass ratio to calculate a solvent ratio, and a solvent displacement ratio was determined based on the solvent ratio.

In Tables 1, 2, 5, and 6, HSA in the column of surface treating agent stands for 12-hydroxystearic acid; (a) to (l) stand for silane coupling agents used; and the numeral values in the column of surface treating agent stand for the amount of surface treating agent used in terms of parts by weight in relation to 100 parts by weight of zirconium oxide.

The silane coupling agents (a) to (l) stand for as follows.
(a): 3-methacryloyloxypropyltrimethoxysilane
(b): 3-methacryloyloxypropylmethyldimethoxysilane
(c): 3-methacryloyloxypropyltriethoxysilane
(d): hexyltrimethoxysilane
(e): vinyltrimetoxysilane
(f): 3-acryloyloxypropyltrimethoxysilane
(g): decyltrimetoxysilane
(h): trifluoropropyltrimetoxysilane
(i): N-2-(aminoethyl)-3-aminopropyltrimethoxysilane
(j): 3-aminopropyltrimethoxysilane
(k): 3-glycidoxypropyltrimetoxysilane
(l): 2-(3, 4-epoxycyclohexyl)ethyltrimethoxysilane Example 1

1.5 g of 3-methacryloyloxypropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, The resultant was stirred for 5 minutes at a temperature of 22° C. to surface treat the dispersion with the surface treating agent.

While the methanol dispersion of zirconium oxide particles (II) thus treated was heated under an atmospheric pressure to distill the methanol out of the dispersion, MEK was added dropwise to the dispersion at the same rate as the rate at which the methanol was distilled, thereby performing solvent replacement, to provide a 30% by weight MEK dispersion of particles of zirconium oxide solid solution containing yttrium.

As mentioned above, the solvent displacing process 1 refers to a process in which, while a methanol dispersion of zirconium oxide particles is heated under an atmospheric pressure to distil the methanol out of the dispersion, an organic solvent is added to the dispersion at the same rate at which the methanol is distilled, thereby performing solvent displacement.

Example 2

1.5 g of 3-methacryloyloxypropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added to the resultant, followed by stirring the resulting dispersion of zirconium oxide particles in a mixture of methanol and MEK for 5 minutes at a temperature of 29° C., thereby surface treating the dispersion with the surface treating agent.

The dispersion of zirconium oxide particles thus treated was heated under an atmospheric pressure to distill the methanol out of the dispersion, thereby performing solvent displacement, to provide an about 30% by weight MEK dispersion of particles of zirconium oxide solid solution containing yttrium.

As mentioned above, the solvent displacing process 2 refers to a process in which the surface treating agent is added to a methanol dispersion of zirconium oxide particles, and then an organic solvent is added to the resultant dispersion to surface treat the dispersion, and then the methanol is distilled out of the resultant under an atmospheric pressure, thereby performing solvent displacement.

Example 3

1.5 g of 3-methacryloyloxypropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added to the resulting dispersion. The resulting dispersion of zirconium oxide particles in a mixture of methanol and MEK was stirred for 5 minutes at a temperature of 26° C., thereby surface treating the dispersion with the surface treating agent.

The dispersion of zirconium oxide particles thus treated was heated under reduced pressure to distill the methanol out of the dispersion, thereby performing solvent displacement to provide an about 30% by weight MEK dispersion of particles of zirconium oxide solid solution containing yttrium.

As mentioned above, the solvent displacing process 3 refers to a process in which the surface treating agent is added to a methanol dispersion of zirconium oxide particles, and then an organic solvent is added to the resulting dispersion to surface treat the dispersion, and then the methanol is distilled under reduced pressure out of the resultant thereby performing solvent displacement.

Example 4

A solution of 2.7 g of 3-methacryloyloxypropyltrimethoxysilane (9.0 parts by weight in relation to 100 parts by weight of zirconium oxide) and 0.3 g of 12-hydroxystearic acid (1.0 parts by weight in relation to 100 parts by weight of zirconium oxide) in MEK was added to 100 g of the methanol dispersion of zirconium oxide particles (II) obtained in Reference Example 1. Then, the resulting dispersion of zirconium oxide particles in a mixture of methanol and MEK was stirred for 5 minutes at a temperature of 28° C., thereby surface treating the dispersion with the surface treating agent.

The dispersion of zirconium oxide particles thus treated was heated under reduced pressure to distill the methanol out of the dispersion, thereby performing solvent displacement, to provide an about 30% by weight MEK dispersion of particles of zirconium oxide solid solution containing yttrium.

As mentioned above, the solvent displacing process 4 refers to a process in which a solution of the surface treating agent dissolved in an organic solvent is added to a methanol dispersion of zirconium oxide particles to surface treat the dispersion, and then the methanol is distilled out of the resultant thereby performing solvent displacement.

Examples 5-38

A silane coupling agent and 12-hydroxystearic acid (and an organic solvent) were added each in an amount indicated in Tables 1 and 2, respectively, to 100 g of the methanol dispersion of zirconium oxide particles (II) obtained in Reference Example 1. The resulting dispersion of zirconium oxide particles in methanol (and the organic solvent) was stirred for 5 minutes at the temperature indicated in Tables 1 and 2, thereby surface treating the dispersion with the surface treating agent.

Each of the dispersions of zirconium oxide particles thus treated was subjected to solvent displacement by either of the solvent displacing processes 1, 2 and 3, as indicated in Tables 1 and 2, to provide an about 30% by weight organic solvent dispersion of particles of zirconium oxide solid solution of containing yttrium.

Comparative Example 1

Neither 3-methacryloyloxypropyltrimethoxysilane nor 12-hydroxystearic acid was added to 100 g of the methanol dispersion of zirconium oxide particles (II) obtained in Reference Example 1, but MEK only was added. The resulting dispersion of zirconium oxide particles in a mixture of methanol and MEK was stirred for 5 minutes at a temperature of 15° C.

The dispersion thus obtained was subjected to solvent displacement by the solvent displacing process 2, but the dispersion lost fluidity and gelled in the middle of solvent displacement.

Comparative Example 2

1.5 g of 3-methacryloyloxypropyltrimethoxysilane (5.0 parts by weight in relation to 100 parts by weight of zirconium oxide) was added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 13° C. thereby surface treating the dispersion with the surface treating agent.

The dispersion of zirconium oxide particles thus treated was subjected to solvent displacement by the solvent displacing process 2, but the zirconium oxide particles sedimented in the middle of solvent displacement, to fail to provide an MEK dispersion.

Comparative Examples 3-5

Either of 3-methacryloyloxypropyltrimethoxysilane and 12-hydroxystearic acid was added in an amount indicated in Table 5 together with MEK to 100 g of the methanol dispersion of zirconium oxide particles (II) obtained in Reference Example 1. The resulting dispersion of zirconium oxide particles in a mixture of methanol and MEK was stirred for 5 minutes at the temperature shown in Table 5, thereby surface treating the dispersion with the surface treating agent.

The dispersion of zirconium oxide particles thus treated was subjected to solvent displacement by the solvent displacing process 2 to provide an about 30% by weight organic solvent dispersion of particles of zirconium oxide solid solution containing yttrium. Any of the dispersions obtained were gelled 7 days after it was prepared.

Comparative Examples 6-8

Either of 3-methacryloyloxypropyltrimethoxysilane and 12-hydroxystearic acid was added in an amount indicated in Table 5 together with an organic solvent indicated in Table 5 to 100 g of the methanol dispersion of zirconium oxide particles (II) obtained in Reference Example 1. The resulting dispersion of zirconium oxide particles in a mixture of methanol and MEK was stirred for 5 minutes, thereby surface treating the dispersion with the surface treating agent.

The dispersion of zirconium oxide particles thus treated was subjected to solvent displacement by the solvent displacing process 3. The dispersion lost fluidity and gelled in the middle of solvent displacement.

Comparative Example 9

1.5 g of 12-hydroxystearic acid (5.0 parts by weight in relation to 100 parts by weight of zirconium oxide) was added to 100 g of the methanol dispersion of zirconium oxide particles (II) obtained in Reference Example 1, and then IPA was added. The resulting dispersion of zirconium oxide particles in a mixture of methanol and IPA was stirred for 3 minutes at a temperature of 39° C., thereby surface treating the dispersion with the surface treating agent.

The dispersion of zirconium oxide particles thus treated was subjected to solvent displacement by the solvent displacing process 3 to provide an about 30% by weight IPA dispersion of particles of zirconium oxide solid solution containing yttrium. The resulting dispersion was superior in transparency, but it gelled 7 days after it was prepared.

Comparative Example 10

1.5 g of 3-methacryloyloxypropyltrimethoxysilane (5.0 parts by weight in relation to 100 parts by weight of zirconium oxide) and PGME were added to 100 g of the methanol dispersion of zirconium oxide particles (II) obtained in Reference Example 1. The resulting dispersion of zirconium oxide particles in a mixture of methanol and PGME was stirred for 5 minutes at a temperature of 20° C., thereby surface treating the dispersion with the surface treating agent.

The dispersion of particles of zirconium oxide thus treated was subjected to solvent displacement by the solvent displacing process 3. The dispersion lost fluidity and gelled in the middle of solvent displacement.

Comparative Example 11

1.5 g of 12-hydroxystearic acid (5.0 parts by weight in relation to 100 parts by weight of zirconium oxide) was added to 100 g of the methanol dispersion of zirconium oxide particles (II) obtained in Reference Example 1, and then PGME was added. The resulting dispersion of zirconium oxide particles in a mixture of methanol and PGME was stirred for 5 minutes at a temperature of 29° C., thereby surface treating the dispersion with the surface treating agent.

The dispersion of zirconium oxide particles thus treated was subjected to solvent displacement by the solvent displacing process 3 to provide an about 30% by weight organic solvent dispersion of particles of zirconium oxide solid solution containing yttrium. The resulting dispersion gelled 7 days after it was prepared.

Comparative Example 12

1.5 g of 3-methacryloyloxypropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, thereby surface treating the dispersion with the surface treating agent.

The dispersion of zirconium oxide particles thus treated was heated under an atmospheric pressure to distil methanol out of the dispersion completely to provide a powder of zirconium oxide solid solution containing yttrium.

The zirconium oxide powder obtained was added to MEK, stirred and left standing. The zirconium oxide particles sedimented to fail to give an MEK dispersion.

Comparative Example 13

0.15 g of 3-methacryloyloxypropyltrimethoxysilane (0.5 parts by weight in relation to 100 parts by weight of zirconium oxide) and 0.15 g of 12-hydroxystearic acid (0.5 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 20° C. thereby surface treating the dispersion with the surface treating agent. The dispersion of zirconium oxide particles thus treated was subjected to solvent displacement by the solvent displacing process 3, but the dispersion lost fluidity and gelled in the middle of solvent displacement.

Comparative Example 14

1.5 g of 3-methacryloyloxypropyltrimethoxysilane (5 parts by weight in relation to 100 parts by weight of zirconium oxide) and 1.5 g of stearic acid (5 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 24° C. thereby surface treating the dispersion with the surface treating agent.

The dispersion of zirconium oxide particles thus treated was subjected to solvent displacement by the solvent displacing process 2 to provide an about 30% by weight MEK dispersion of particles of zirconium oxide solid solution containing yttrium. However, while solvent displacing, the zirconium oxide particles agglomerated remarkably to provide an MEK dispersion inferior in transparency.

Comparative Example 15

100 g of the methanol dispersion of zirconium oxide particles (II) obtained in Reference Example 1 was heated under an atmospheric pressure to distil methanol out of the dispersion completely. The residue was dried to provide a powder of zirconium oxide solid solution containing yttrium.

1.5 g of 3-methacryloyloxypropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to the powder of zirconium oxide solid solution containing yttrium obtained above, and the resultant was dry-mixed in a mortar. The thus obtained zirconium oxide powder was added to MEK, and the resultant mixture was stirred and left standing to find that the zirconium oxide particles sedimented in the mixture to fail to provide an MEK dispersion.

Comparative Example 16

1.5 g of N-2-(aminoethyl)-3-aminopropyltrimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 23° C. thereby surface treating the dispersion with the surface treating agent.

The dispersion of zirconium oxide particles thus treated was subjected to solvent displacement by the solvent displacing process 2, to provide an about 30% by weight MEK dispersion of particles of zirconium oxide solid solution of containing yttrium. The resulting dispersion was superior in transparency, but it gelled 7 days after it was prepared.

Comparative Example 17

1.5 g of 3-aminopropyl trimethoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 25° C. thereby surface treating the dispersion with the surface treating agent.

The dispersion of zirconium oxide particles thus treated was subjected to solvent displacement by the solvent displacing process 2. However, the dispersion lost fluidity and gelled in the middle of solvent displacement.

Comparative Example 18

1.5 g of 3-glycidoxypropyltrimetoxysilane (5.0 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide in a mixture of methanol and MEK was stirred for 5 minutes at a temperature of 24° C. thereby surface treating the dispersion with the surface treating agent.

The dispersion of zirconium oxide particles thus treated was subjected to solvent displacement by the solvent displacing process 2 to provide an about 30% by weight MEK dispersion of particles of zirconium oxide solid solution containing yttrium. The resulting dispersion was inferior in transparency as the zirconium oxide particles in the dispersion agglomerated remarkably while solvent displacement, and the dispersion gelled 7 days after it was prepared.

Comparative Example 19

1.5 g of 2-(3,4-epoxycyclohexyl)ethyltrimethoxysilane (5.0 parts by weight in relation to 100 parts by weight of zirconium oxide), 1.5 g of 12-hydroxystearic acid (5.0 parts by weight in relation to 100 parts by weight of zirconium oxide) and MEK were added to 100 g of the methanol dispersion of zirconium oxide particles (II) obtained in Reference Example 1. The resulting dispersion of zirconium oxide in a mixture of methanol and MEK was stirred for 5 minutes at a temperature of 24° C. thereby surface treating the dispersion with the surface treating agent.

The dispersion of zirconium oxide particles thus treated was subjected to solvent displacement by the solvent displacing process 2. However, the zirconium oxide particles sedimented to fail to provide an MEK dispersion.

Comparative Example 20-21

3-Methacryloyloxypropyltrimethoxysilane and 12-hydroxystearic acid each in an amount indicated in Table 6 were added to 100 g of the methanol dispersion of zirconium oxide particles (II) obtained in Reference Example 1, and then MEK was added to the resultant. The resulting dispersion of zirconium oxide particles in a mixture of methanol and MEK was stirred for 5 minutes at the temperature indicated in Table 6, thereby surface treating the dispersion with the surface treating agent.

The dispersion of zirconium oxide particles thus treated was subjected to solvent displacement by the solvent displacing process 3. The dispersion lost fluidity and gelled in the middle of solvent displacement.

Comparative Example 22

1.5 g of 3-methacryloyloxypropyltrimethoxysilane (5.0 parts by weight in relation to 100 parts by weight of zirconium oxide) and 12 g of 12-hydroxystearic acid (40 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide in a mixture of methanol and MEK was stirred for 5 minutes at a temperature of 24° C. thereby surface treating the dispersion with the surface treating agent.

The dispersion of zirconium oxide particles thus treated was subjected to solvent displacement by the solvent displacing process 3, to provide an about 30% by weight MEK dispersion of particles of zirconium oxide solid solution containing yttrium. The resulting organic solvent dispersion was inferior in transparency, and in addition, it had a high viscosity.

Comparative Example 23

36 g of 3-methacryloyloxypropyltrimethoxysilane (120 parts by weight in relation to 100 parts by weight of zirconium oxide) and 1.5 g of 12-hydroxystearic acid (5.0 parts by weight in relation to 100 parts by weight of zirconium oxide) were added to 100 g of the methanol dispersion of zirconium oxide particles (II) obtained in Reference Example 1, and then MEK was added. The resulting dispersion of zirconium oxide particles in a mixture of methanol and MEK was stirred for 5 minutes at a temperature of 20° C. thereby surface treating the dispersion with the surface treating agent.

The dispersion of zirconium oxide particles thus treated was subjected to solvent displacement by the solvent displacing process 3 to provide an about 30% by weight MEK dispersion of particles of zirconium oxide solid solution containing yttrium. The resulting organic solvent dispersion was inferior in transparency.

TABLE 1

| | Displacing Organic Solvent | Solvent Displacing Process | Surface Treating Agent | | Surface Treating Temperature (° C.) | Solid Content (% by weight) | Content of Zirconium Oxide Particles (% by weight) | Solvent Displacement Rate (%) |
|---|---|---|---|---|---|---|---|---|
| | | | Silane Coupling Agent | HSA | | | | |
| Example 1 | MEK | 1 | (a) 5.0 | 5.0 | 22 | 33.3 | 30.3 | 90.3 |
| Example 2 | MEK | 2 | (a) 5.0 | 5.0 | 29 | 33.3 | 30.3 | 89.9 |
| Example 3 | MEK | 3 | (a) 5.0 | 5.0 | 26 | 34.4 | 31.3 | 89.7 |
| Example 4 | MEK | 4 | (a) 9.0 | 1.0 | 28 | 33.8 | 30.7 | 90.6 |
| Example 5 | MEK | 3 | (a) 7.5 | 2.5 | 34 | 34.0 | 30.9 | 90.3 |
| Example 6 | MEK | 3 | (a) 2.5 | 7.5 | 17 | 34.2 | 31.1 | 90.6 |
| Example 7 | MEK | 3 | (a) 1.0 | 9.0 | 25 | 33.9 | 30.8 | 89.9 |
| Example 8 | MEK | 3 | (a) 4.0 | 1.0 | 22 | 32.2 | 30.7 | 90.0 |
| Example 9 | MEK | 3 | (a) 10.0 | 10.0 | 16 | 36.4 | 30.3 | 91.6 |
| Example 10 | MIBK | 1 | (a) 5.0 | 5.0 | 12 | 32.9 | 29.9 | 94.3 |
| Example 11 | MIBK | 3 | (a) 5.0 | 5.0 | 25 | 33.6 | 30.5 | 93.5 |
| Example 12 | IPA | 1 | (a) 5.0 | 5.0 | 23 | 33.1 | 30.1 | 90.3 |
| Example 13 | IPA | 3 | (a) 5.0 | 5.0 | 19 | 34.0 | 30.9 | 90.2 |
| Example 14 | n-Butanol | 1 | (a) 5.0 | 5.0 | 18 | 33.3 | 30.3 | 95.1 |
| Example 15 | n-Butanol | 3 | (a) 5.0 | 5.0 | 26 | 33.8 | 31.7 | 90.7 |
| Example 16 | PGME | 1 | (a) 5.0 | 5.0 | 10 | 33.3 | 30.3 | 91.0 |
| Example 17 | PGME | 2 | (a) 5.0 | 5.0 | 8 | 33.2 | 30.2 | 90.4 |
| Example 18 | PGME | 3 | (a) 5.0 | 5.0 | 21 | 33.6 | 30.5 | 93.3 |
| Example 19 | Toluene | 1 | (a) 5.0 | 5.0 | 24 | 33.6 | 30.5 | 90.2 |

TABLE 2

| | Displacing Organic Solvent | Solvent Displacing Process | Surface Treating Agent Silane Coupling Agent | HSA | Surface Treating Temperature (° C.) | Solid Content (% by weight) | Content of Zirconium Oxide Particles (% by weight) | Solvent Displacement Rate (%) |
|---|---|---|---|---|---|---|---|---|
| Example 20 | Toluene | 3 | (a) 5.0 | 5.0 | 26 | 33.1 | 30.1 | 90.8 |
| Example 21 | DMAC | 3 | (a) 5.0 | 5.0 | 29 | 33.7 | 30.7 | 92.6 |
| Example 22 | Butyl Acetate | 3 | (a) 5.0 | 5.0 | 22 | 33.6 | 30.5 | 90.8 |
| Example 23 | MEK | 2 | (a) 5.0 | 5.0 | 65 | 34.0 | 30.3 | 89.6 |
| Example 24 | DMSO | 3 | (a) 5.0 | 5.0 | 37 | 33.7 | 30.7 | 87.8 |
| Example 25 | EG | 3 | (a) 5.0 | 5.0 | 28 | 33.6 | 30.5 | 96.3 |
| Example 26 | MEK | 2 | (b) 5.0 | 5.0 | 25 | 35.1 | 31.9 | 93.1 |
| Example 27 | MEK | 2 | (c) 5.0 | 5.0 | 32 | 35.1 | 31.9 | 93.3 |
| Example 28 | MEK | 2 | (d) 5.0 | 5.0 | 24 | 34.7 | 31.5 | 88.4 |
| Example 29 | MEK | 2 | (e) 5.0 | 5.0 | 23 | 34.7 | 31.6 | 86.8 |
| Example 30 | MEK | 2 | (f) 5.0 | 5.0 | 22 | 35.3 | 32.1 | 89.5 |
| Example 31 | MEK | 2 | (g) 5.0 | 5.0 | 27 | 35.3 | 32.1 | 91.2 |
| Example 32 | MEK | 2 | (h) 5.0 | 5.0 | 24 | 36.2 | 32.9 | 90.2 |
| Example 33 | DMIB | 3 | (a) 5.0 | 5.0 | 25 | 33.7 | 30.6 | 91.4 |
| Example 34 | MEK | 3 | (a) 5.0 | 20.0 | 23 | 37.6 | 30.1 | 85.8 |
| Example 35 | MEK | 3 | (a) 100.0 | 5.0 | 24 | 62.0 | 30.3 | 87.1 |
| Example 36 | MEK | 3 | (a) 80.0 | 5.0 | 26 | 57.1 | 30.9 | 86.9 |
| Example 37 | MEK | 3 | (a) 40.0 | 5.0 | 25 | 43.6 | 30.1 | 87.1 |
| Example 38 | MEK | 3 | (a) 20.0 | 5.0 | 24 | 37.8 | 30.2 | 86.8 |

TABLE 3

| | Turbidimetric Transmittance (%) | Transmittance at 400 nm (%) | Transmittance at 800 nm (%) | Particle Size Distribution by Dynamic Light Scattering Method | | | Viscosity (25° C.) | |
|---|---|---|---|---|---|---|---|---|
| | | | | D50 (nm) | D90 (nm) | Dmax (nm) | Immediately after Preparation (mPa·s) | Seven Days After Preparation (mPa·s) |
| Example 1 | 79.1 | 19.0 | 90.1 | 2.9 | 4.6 | 25.5 | 1.2 | 1.1 |
| Example 2 | 79.7 | 19.5 | 90.3 | 3.5 | 5.6 | 30.4 | 1.3 | 1.4 |
| Example 3 | 77.4 | 17.8 | 89.7 | 2.8 | 4.5 | 21.5 | 1.5 | 1.6 |
| Example 4 | 74.4 | 15.7 | 88.9 | 3.5 | 6.8 | 36.1 | 1.3 | 1.3 |
| Example 5 | 76.8 | 17.3 | 89.5 | 4.7 | 8.8 | 43.0 | 1.2 | 1.2 |
| Example 6 | 78.5 | 18.6 | 90.0 | 3.9 | 7.3 | 43.0 | 1.6 | 1.5 |
| Example 7 | 78.0 | 18.3 | 89.9 | 3.3 | 6.0 | 36.1 | 1.8 | 1.9 |
| Example 8 | 78.0 | 18.2 | 89.9 | 3.9 | 7.5 | 43.0 | 1.8 | 1.6 |
| Example 9 | 77.5 | 17.8 | 89.7 | 3.1 | 5.6 | 30.4 | 1.7 | 1.5 |
| Example 10 | 84.1 | 33.0 | 91.8 | 4.8 | 6.8 | 43.0 | 1.4 | 1.5 |
| Example 11 | 81.6 | 26.1 | 90.9 | 4.1 | 7.6 | 36.1 | 1.6 | 1.5 |
| Example 12 | 87.0 | 41.1 | 93.0 | 4.8 | 6.5 | 30.4 | 5.5 | 6.1 |
| Example 13 | 84.3 | 33.8 | 91.9 | 4.1 | 6.8 | 36.1 | 6.7 | 6.5 |
| Example 14 | 87.9 | 43.7 | 93.4 | 3.1 | 6.5 | 25.5 | 6.3 | 5.9 |
| Example 15 | 88.3 | 44.8 | 93.6 | 3.6 | 6.8 | 30.4 | 8.1 | 8.6 |
| Example 16 | 81.2 | 24.8 | 90.8 | 4.8 | 7.6 | 36.1 | 5.6 | 6.4 |
| Example 17 | 77.6 | 17.9 | 89.7 | 4.9 | 9.0 | 36.1 | 5.6 | 5.7 |
| Example 18 | 78.3 | 18.5 | 89.9 | 6.4 | 11.5 | 43.0 | 9.0 | 9.2 |
| Example 19 | 72.0 | 14.1 | 88.3 | 7.5 | 18.3 | 51.1 | 2.0 | 3.1 |

TABLE 4

| | Turbidimetric Transmittance (%) | Transmittance at 400 nm (%) | Transmittance at 800 nm (%) | Particle Size Distribution by Dynamic Light Scattering Method | | | Viscosity (25° C.) | |
|---|---|---|---|---|---|---|---|---|
| | | | | D50 (nm) | D90 (nm) | Dmax (nm) | Immediately after Preparation (mPa·s) | Seven Days After Preparation (mPa·s) |
| Example 20 | 73.1 | 14.8 | 88.6 | 7.9 | 15.1 | 48.0 | 2.5 | 2.3 |
| Example 21 | 89.9 | 49.5 | 94.5 | 2.9 | 4.6 | 25.5 | 4.7 | 5.8 |

TABLE 4-continued

|  | Turbidimetric Transmittance (%) | Transmittance at 400 nm (%) | Transmittance at 800 nm (%) | Particle Size Distribution by Dynamic Light Scattering Method | | | Viscosity (25° C.) | |
|---|---|---|---|---|---|---|---|---|
|  |  |  |  | D50 (nm) | D90 (nm) | Dmax (nm) | Immediately after Preparation (mPa·s) | Seven Days After Preparation (mPa·s) |
| Example 22 | 74.8 | 16.0 | 80.1 | 6.9 | 14.7 | 51.1 | 3.0 | 4.5 |
| Example 23 | 78.8 | 18.8 | 90.1 | 3.1 | 4.9 | 25.5 | 2.3 | 1.9 |
| Example 24 | 84.9 | 35.2 | 92.1 | 4.1 | 9.0 | 43.0 | 7.1 | 8.6 |
| Example 25 | 91.7 | 54.5 | 95.7 | 5.0 | 7.3 | 43.0 | 1.4 | 1.5 |
| Example 26 | 78.2 | 18.4 | 89.9 | 3.0 | 4.8 | 30.4 | 1.3 | 1.8 |
| Example 27 | 77.5 | 17.9 | 89.8 | 3.1 | 5.3 | 30.4 | 1.4 | 1.9 |
| Example 28 | 82.1 | 27.3 | 91.1 | 2.8 | 4.3 | 18.1 | 2.0 | 1.9 |
| Example 29 | 80.9 | 27.3 | 94.7 | 3.0 | 5.0 | 25.5 | 2.3 | 2.6 |
| Example 30 | 80.1 | 18.6 | 93.2 | 2.7 | 4.0 | 21.5 | 0.8 | 1.7 |
| Example 31 | 79.3 | 19.2 | 90.3 | 3.0 | 4.6 | 25.5 | 1.4 | 1.9 |
| Example 32 | 76.5 | 17.2 | 89.5 | 3.6 | 5.9 | 36.1 | 2.6 | 2.6 |
| Example 33 | 81.1 | 24.6 | 90.8 | 6.9 | 15.1 | 51.1 | 6.1 | 7.4 |
| Example 34 | 79.4 | 19.8 | 90.3 | 3.5 | 6.5 | 36.1 | 2.3 | 2.0 |
| Example 35 | 72.2 | 14.3 | 88.4 | 3.3 | 5.7 | 30.4 | 3.7 | 3.9 |
| Example 36 | 74.2 | 15.6 | 88.9 | 3.1 | 5.0 | 25.5 | 2.6 | 3.5 |
| Example 37 | 78.5 | 18.6 | 90.0 | 3.2 | 5.7 | 30.4 | 2.0 | 1.8 |
| Example 38 | 80.1 | 21.7 | 90.5 | 3.3 | 5.4 | 30.4 | 1.9 | 1.4 |

TABLE 5

|  | Displacing Organic Solvent | Solvent Displacing Process | Surface Treating Agent | | | Surface Treating Temperature (° C.) | Solid Content (% by weight) | Content of Zirconium Oxide Particles (% by weight) | Solvent Displacement Rate (%) |
|---|---|---|---|---|---|---|---|---|---|
|  |  |  | Silane Coupling Agent | HSA | Stearic Acid |  |  |  |  |
| Comparative 1 | MEK | 2 | — | — | — | 15 | Gelled in the middle of solvent displacement | | |
| Comparative 2 | MEK | 2 | (a) 5.0 | — | — | 13 | Zirconium oxide particles sedimented in the middle of solvent dispalcement | | |
| Comparative 3 | MEK | 2 | — | 5.0 | — | 13 | 31.6 | 30.1 | 90.2 |
| Comparative 4 | MEK | 2 | (a) 10.0 | — | — | 34 | 33.0 | 30.0 | 90.0 |
| Comparative 5 | MEK | 2 | — | 10.0 | — | 24 | 33.7 | 30.7 | 88.8 |
| Comparative 6 | MIBK | 3 | (a) 5.0 | — | — | 18 | Gelled in the middle of solvent displacement | | |
| Comparative 7 | MIBK | 3 | — | 5.0 | — | 18 | Gelled in the middle of solvent displacement | | |
| Comparative 8 | IPA | 3 | (a) 5.0 | — | — | 33 | Gelled in the middle of solvent displacement | | |
| Comparative 9 | IPA | 3 | — | 5.0 | — | 39 | 32.1 | 30.6 | 90.6 |
| Comparative 10 | PGME | 3 | (a) 5.0 | — | — | 20 | Gelled in the middle of solvent displacement | | |
| Comparative 11 | PGME | 3 | — | 5.0 | — | 29 | 32.8 | 31.3 | 93.5 |
| Comparative 12 | MEK | — | (a) 5.0 | 5.0 | — | 22 | Zirconium oxide particles sedimented | | |

TABLE 6

|  | Displacing Organic Solvent | Solvent Displacing Process | Surface Treating Agent | | | Surface Treating Temperature (° C.) | Solid Content (% by weight) | Content of Zirconium Oxide Particles (% by weight) | Solvent Displacement Rate (%) |
|---|---|---|---|---|---|---|---|---|---|
|  |  |  | Silane Coupling Agent | HSA | Stearic Acid |  |  |  |  |
| Comparative 13 | MEK | 3 | (a) 0.5 | 0.5 | — | 20 | Gelled in the middle of solvent displacement | | |
| Comparative 14 | MEK | 2 | (a) 5.0 | — | 5.0 | 24 | 32.4 | 29.5 | 87.0 |
| Comparative 15 | MEK | — | (a) 5.0 | 5.0 | — | — | Zirconium oxide particles sedimented | | |
| Comparative 16 | MEK | 2 | (i) 5.0 | 5.0 | — | 23 | 36.9 | 33.5 | 89.8 |
| Comparative 17 | MEK | 2 | (j) 5.0 | 5.0 | — | 25 | Gelled in the middle of solvent displacement | | |
| Comparative 18 | MEK | 2 | (k) 5.0 | 5.0 | — | 24 | 35.8 | 32.6 | 88.7 |
| Comparative 19 | MEK | 2 | (l) 5.0 | 5.0 | — | 24 | Zirconium oxide particles sedimented in the middle of solvent displacement | | |
| Comparative 20 | MEK | 3 | (a) 5.0 | 80.0 | — | 23 | Gelled in the middle of solvent displacement | | |
| Comparative 21 | MEK | 3 | (a) 5.0 | 60.0 | — | 25 | Gelled in the middle of solvent displacement | | |
| Comparative 22 | MEK | 3 | (a) 5.0 | 40.0 | — | 24 | 43.8 | 30.2 | 87.8 |
| Comparative 23 | MEK | 3 | (a) 120 | 5.0 | — | 20 | 68.9 | 30.6 | 89.4 |

TABLE 7

| | Turbidimetric Transmittance (%) | Transmittance at 400 nm (%) | Transmittance at 800 nm (%) | Particle Size Distribution by Dynamic Light Scattering Method | | | Viscosity (25° C.) | |
|---|---|---|---|---|---|---|---|---|
| | | | | D50 (nm) | D90 (nm) | Dmax (nm) | Immediately after Preparation (mPa·s) | Seven Days After Preparation (mPa·s) |
| Comparative 1 | — | — | — | — | — | — | — | — |
| Comparative 2 | — | — | — | — | — | — | — | — |
| Comparative 3 | 65.0 | 9.9 | 86.3 | 2.8 | 3.3 | 60.2 | 1.6 | Gelled |
| Comparative 4 | 39.9 | 0.1 | 68.5 | 14.9 | 31.4 | 121.0 | 0.9 | Gelled |
| Comparative 5 | 73.9 | 7.5 | 89.0 | 3.9 | 7.9 | 43.0 | 1.3 | Gelled |
| Comparative 6 | — | — | — | — | — | — | — | — |
| Comparative 7 | — | — | — | — | — | — | — | — |
| Comparative 8 | — | — | — | — | — | — | — | — |
| Comparative 9 | 69.6 | 12.6 | 87.7 | 5.5 | 8.5 | 85.9 | 6.4 | Gelled |
| Comparative 10 | — | — | — | — | — | — | — | — |
| Comparative 11 | 70.9 | 13.4 | 88.1 | 6.8 | 11.2 | 81.7 | 8.6 | Gelled |
| Comparative 12 | — | — | — | — | — | — | — | — |

TABLE 8

| | Turbidimetric Transmittance (%) | Transmittance at 400 nm (%) | Transmittance at 800 nm (%) | Particle Size Distribution by Dynamic Light Scattering Method | | | Viscosity (25° C.) | |
|---|---|---|---|---|---|---|---|---|
| | | | | D50 (nm) | D90 (nm) | Dmax (nm) | Immediately after Preparation (mPa·s) | Seven Days After Preparation (mPa·s) |
| Comparative 13 | — | — | — | — | — | — | — | — |
| Comparative 14 | 17.8 | 0.0 | 25.0 | 1.6 | 78.1 | 204.0 | 1.5 | 2.1 |
| Comparative 15 | — | — | — | — | — | — | — | — |
| Comparative 16 | 74.1 | 15.5 | 88.9 | 3.1 | 4.1 | 25.5 | 36.0 | Gelled |
| Comparative 17 | — | — | — | — | — | — | — | — |
| Comparative 18 | 14.6 | 0.0 | 16.6 | 3484.0 | 6011.0 | 6540.0 | 18.0 | Gelled |
| Comparative 19 | — | — | — | — | — | — | — | — |
| Comparative 20 | — | — | — | — | — | — | — | — |
| Comparative 21 | — | — | — | — | — | — | — | — |
| Comparative 22 | 60.8 | 7.6 | 84.7 | 12.9 | 31.9 | 102.2 | 107.0 | 203.0 |
| Comparative 23 | 51.0 | 3.3 | 78.9 | 3.5 | 6.6 | 36.1 | 4.6 | 4.4 |

The invention claimed is:

1. An organic solvent dispersion of zirconium oxide particles in a content of 20% by weight or more in an organic solvent except methanol and ethanol,
wherein the zirconium oxide particles are surface-treated with a surface treating agent comprising a silane coupling agent having the general formula (I)

$$(RO)_n-Si-X_{4-n} \quad (I)$$

wherein R is an alkyl group having carbon atoms of 1-4, n is 2 or 3, X is an alkyl, a fluoroalkyl, a vinyl or a (meth)acryloyloxyalkyl group, and 12-hydroxystearic acid, and
wherein the zirconium oxide particles in the organic solvent have a D50 in a range of 1 to 20 nm, and
wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while an increase in the viscosity is 10 mPa·s or less seven days after production as compared to that of the dispersion immediately after production.

2. The organic solvent dispersion of zirconium oxide in an organic solvent according to claim 1, in which the zirconium oxide particles are surface-treated with 1-100 parts by weight of the silane coupling agent and 1-20 parts by weight of 12-hydroxystearic acid each in relation to 100 parts by weight of the zirconium oxide particles.

3. The organic solvent dispersion of zirconium oxide in an organic solvent according to claim 1, in which the organic solvent is at least one selected from methyl isobutyl ketone, methyl ethyl ketone, butanol, propanol, propylene glycol monomethyl ether, toluene, dimethylsulfoxide, N,N-dimethylacetamide, N,N-trimethylpropionamide, butyl acetate, and ethylene glycol.

4. The organic solvent dispersion of zirconium oxide in an organic solvent according to claim 2, in which the organic solvent is at least one selected from methyl isobutyl ketone, methyl ethyl ketone, butanol, propanol, propylene glycol monomethyl ether, toluene, dimethylsulfoxide, N,N-dimethylacetamide, N,N-trimethylpropionamide, butyl acetate, and ethylene glycol.

5. A method for producing an organic solvent dispersion of zirconium oxide particles in a content of 20% by weight or more in an organic solvent except methanol and ethanol,
wherein the zirconium oxide particles in the organic solvent have a D50 in a range of 1 to 20 nm, and
wherein the organic solvent dispersion has a transmittance of 10% or more at a wavelength of 400 nm and a transmittance of 80% or more at a wavelength of 800 nm, a viscosity of 10 mPa·s or less at a temperature of 25° C. immediately after production while an increase in the viscosity is 10 mPa·s or less seven days after production as compared to that of the dispersion immediately after production;

the method comprising:

a surface treating process for surface treating an alcohol dispersion of zirconium oxide particles in at least one alcohol solvent selected from methanol and ethanol with a surface treating agent comprising a silane coupling agent and 12-hydroxystearic acid thereby surface treating the zirconium oxide particles; and a solvent replacing process for replacing the alcohol solvent that is a dispersion medium of the alcohol dispersion of zirconium oxide particles with the organic solvent except methanol and ethanol, wherein the silane coupling agent has the general formula $$(RO)_n\text{—Si—}X_{4-n} \quad (I)$$

wherein R is an alkyl group having carbon atoms of 1-4, n is 2 or 3, X is an alkyl, a fluoroalkyl, a vinyl or a (meth) acryloyloxyalkyl group.

6. The method for producing an organic solvent dispersion of zirconium oxide particles according to claim 5, in which the zirconium oxide particles are surface-treated with the silane coupling agent in an amount of 1-100 parts by weight and 12-hydroxystearic acid in an amount of 1-20 parts by weight each in relation to 100 parts by weight of particles of zirconium oxide.

7. The method for producing a dispersion of particles of zirconium oxide in an organic solvent according to claim 5, in which the organic solvent is at least one selected from methyl isobutyl ketone, methyl ethyl ketone, butanol, propanol, propylene glycol monomethyl ether, toluene, dimethylsulfoxide, N,N-dimethylacetamide, N,N-trimethylpropionamide, butyl acetate, and ethylene glycol.

8. The method for producing an organic solvent dispersion of particles of zirconium oxide in an organic solvent according to claim 5, in which the alcohol dispersion of zirconium oxide particles has a content of 20% by weight or more, has the zirconium oxide particles of D50 in a range of 1 nm to 20 nm, has a transmittance of 15% or more at a wavelength of 400 nm and 80% or more at a wavelength of 800 nm.

9. The method for producing an organic solvent dispersion of particles of zirconium oxide in an organic solvent according to claim 4, in which in the surface treating process the alcohol dispersion of zirconium oxide particles is surface-treated with the surface treating agent in the presence of an organic solvent except the alcohol solvent.

10. The method for producing an organic solvent dispersion of particles of zirconium oxide in an organic solvent according to claim 4, in which the alcohol dispersion used in the surface treating process is such that it is obtained by a method comprising the processes (a) to (e):

(a) a process for reacting a zirconium salt with an alkali in water to obtain a first aqueous slurry of zirconium oxide particles, (b) a process for filtering, washing and repulping the first aqueous slurry of zirconium oxide particles to obtain a second aqueous slurry of zirconium oxide particles, (c) a process for adding to the second aqueous slurry of zirconium oxide particles one part by mole or more of an organic acid relative to one part by mole of zirconium in the second aqueous slurry, and hydrothermally treating the resultant at a temperature of 170° C. or higher to obtain an aqueous dispersion of zirconium oxide particles, (d) a process for washing the aqueous dispersion of zirconium oxide particles thus obtained, and, (e) a process for replacing water as a dispersion medium of the aqueous dispersion of zirconium oxide particles obtained in the process (d) with at least one alcohol solvent selected from methanol and ethanol.

11. The method for producing an organic solvent dispersion of particles of zirconium oxide in an organic solvent according to claim 10, in which the zirconium salt is at least one selected from a nitrate, an acetate, and a chloride.

12. The method for producing an organic solvent dispersion of particles of zirconium oxide in an organic solvent according to claim 10, in which the zirconium salt is zirconium oxychloride.

13. The method for producing an organic solvent dispersion of particles of zirconium oxide in an organic solvent according to claim 10, in which the alcohol dispersion of zirconium oxide particles has a content of zirconium oxide particles of 20% or more, has the zirconium oxide particles of D50 in a range of 1 nm to 20 nm, and has a transmittance of 15% or more at a wavelength of 400 nm and a transmittance of 80% or more at a wavelength of 800 nm.

* * * * *